Feb. 26, 1963  J. V. DAVIS ETAL  3,078,859
APPARATUS FOR LIQUID TREATING AND CONVEYING WORK
Original Filed March 30, 1959  8 Sheets-Sheet 1
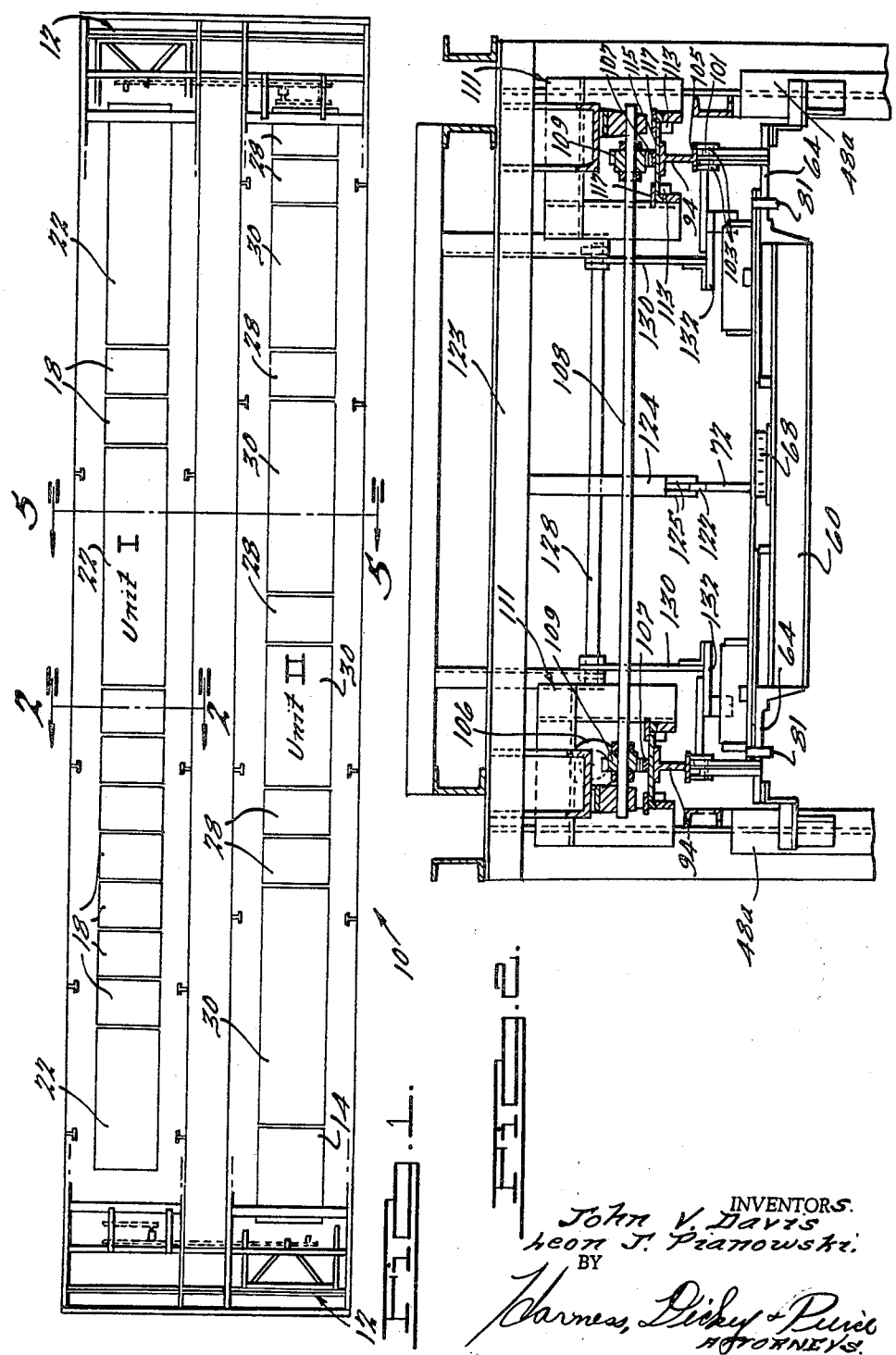
INVENTORS.
John V. Davis
Leon J. Pianowski
BY
Harness, Dickey & Pierce
ATTORNEYS.

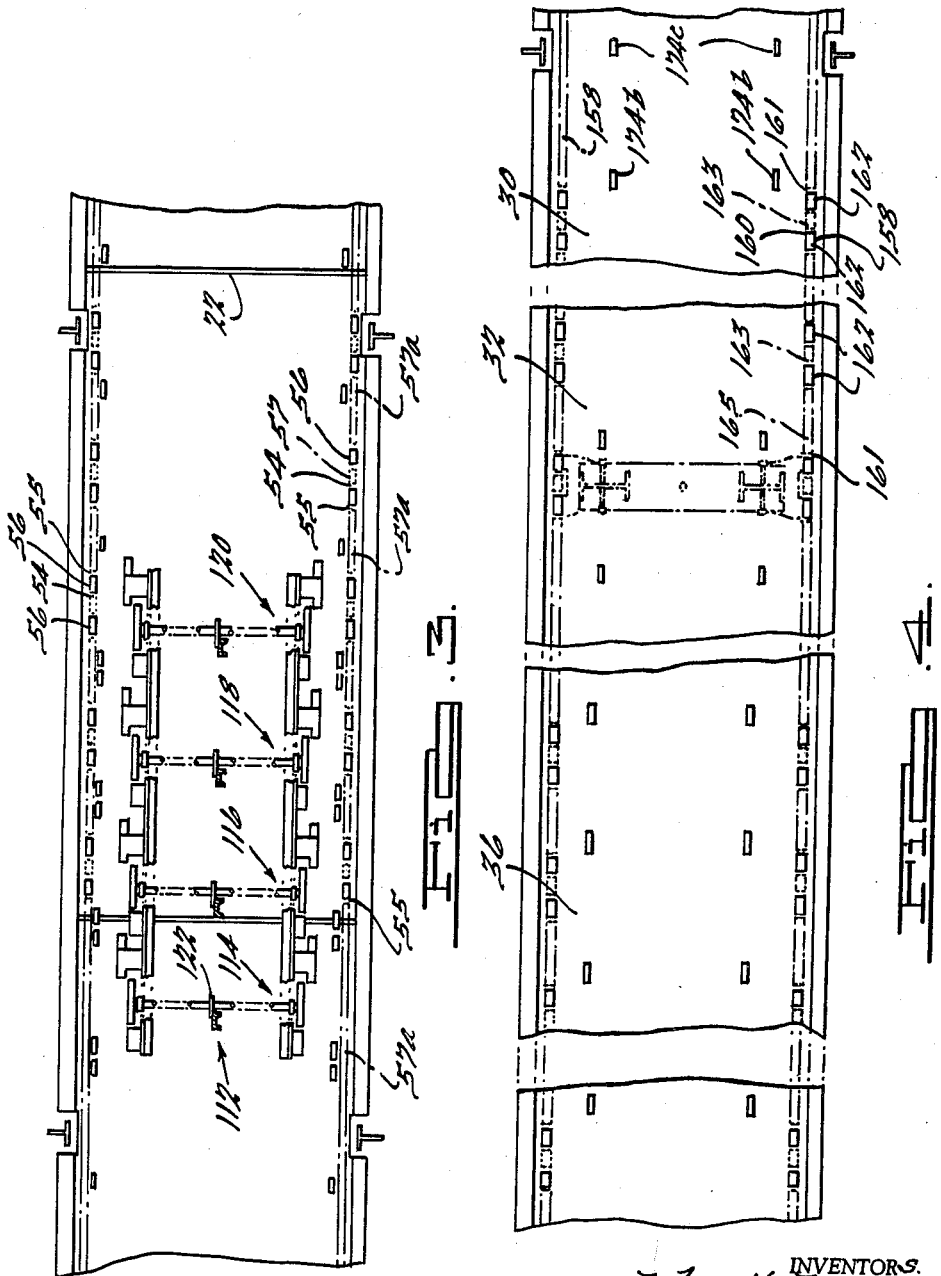

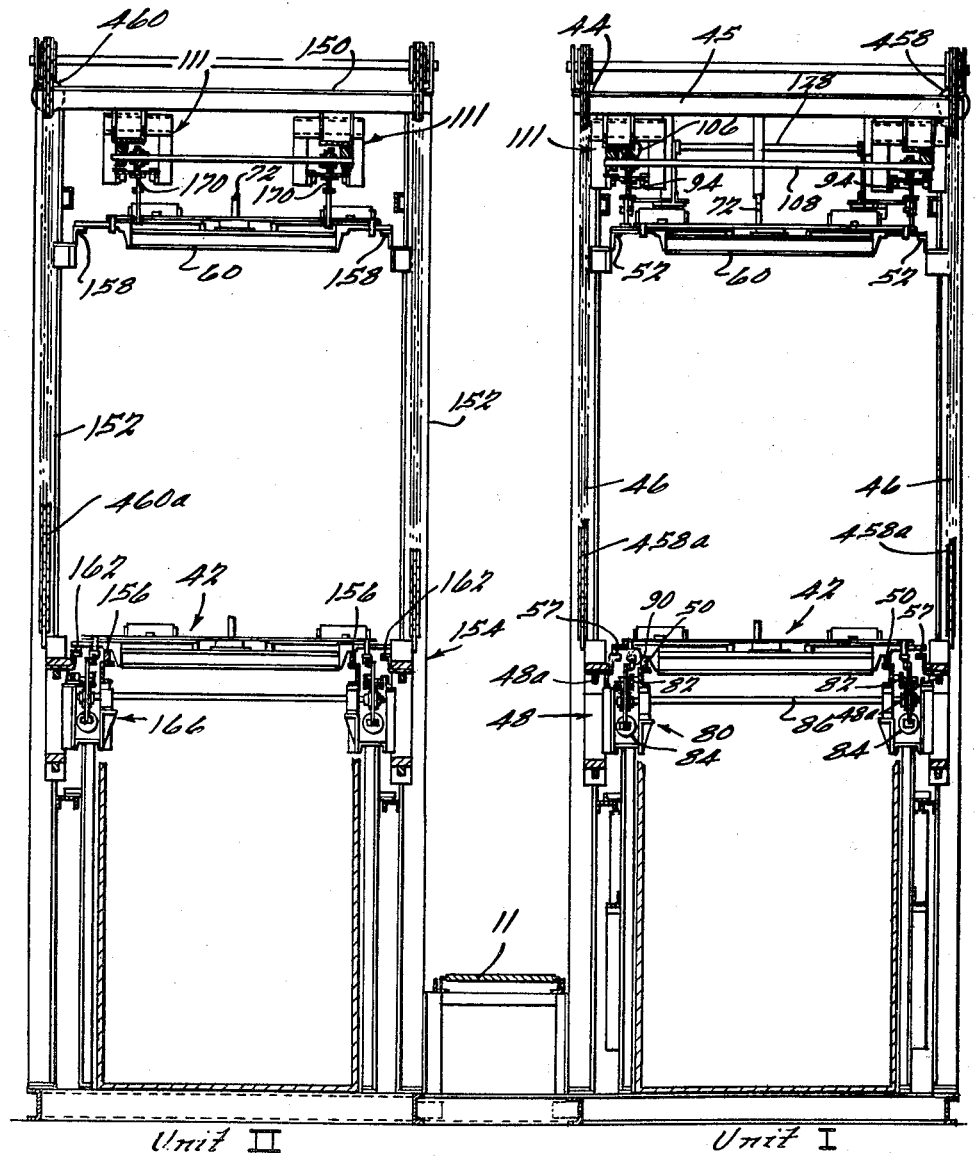

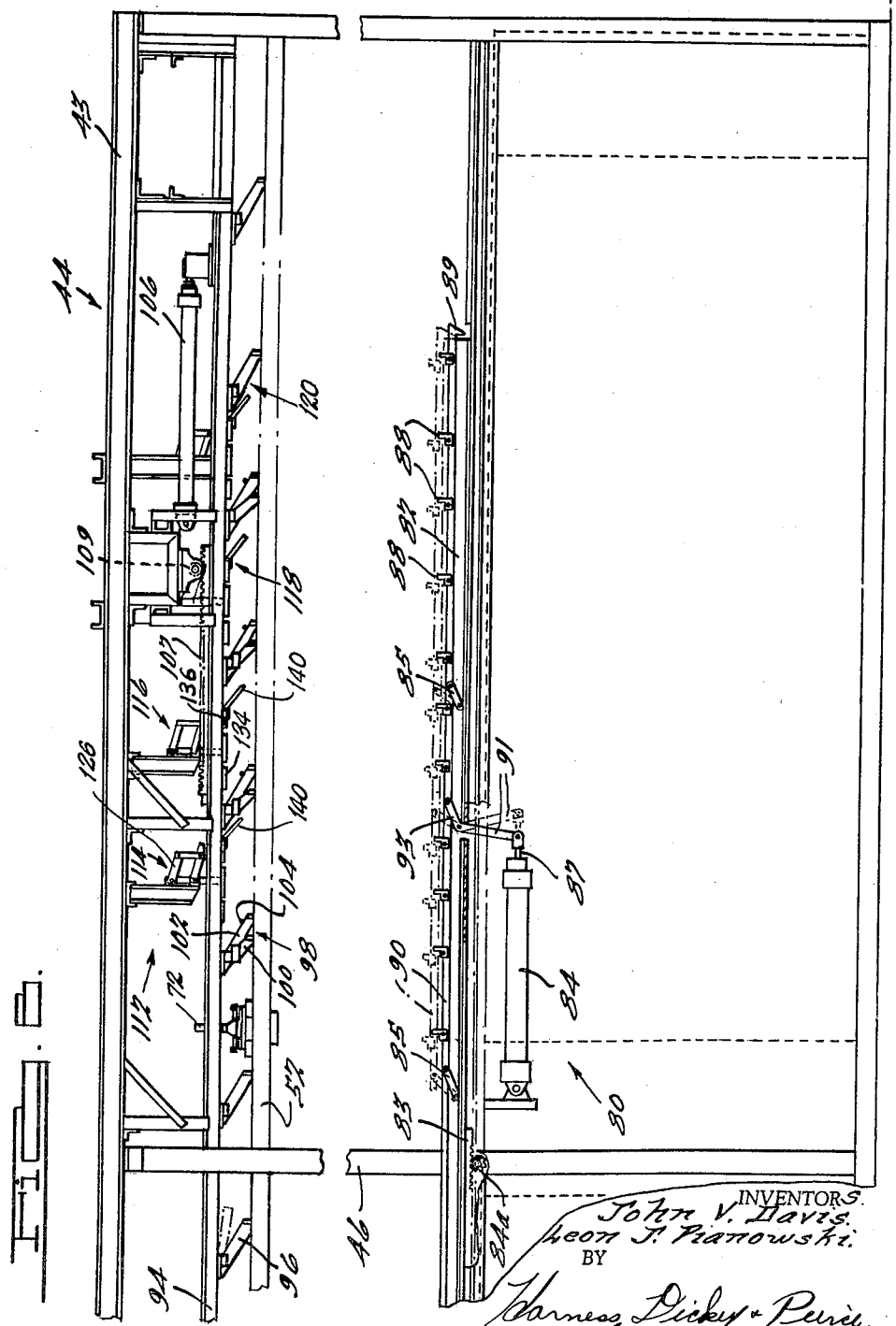

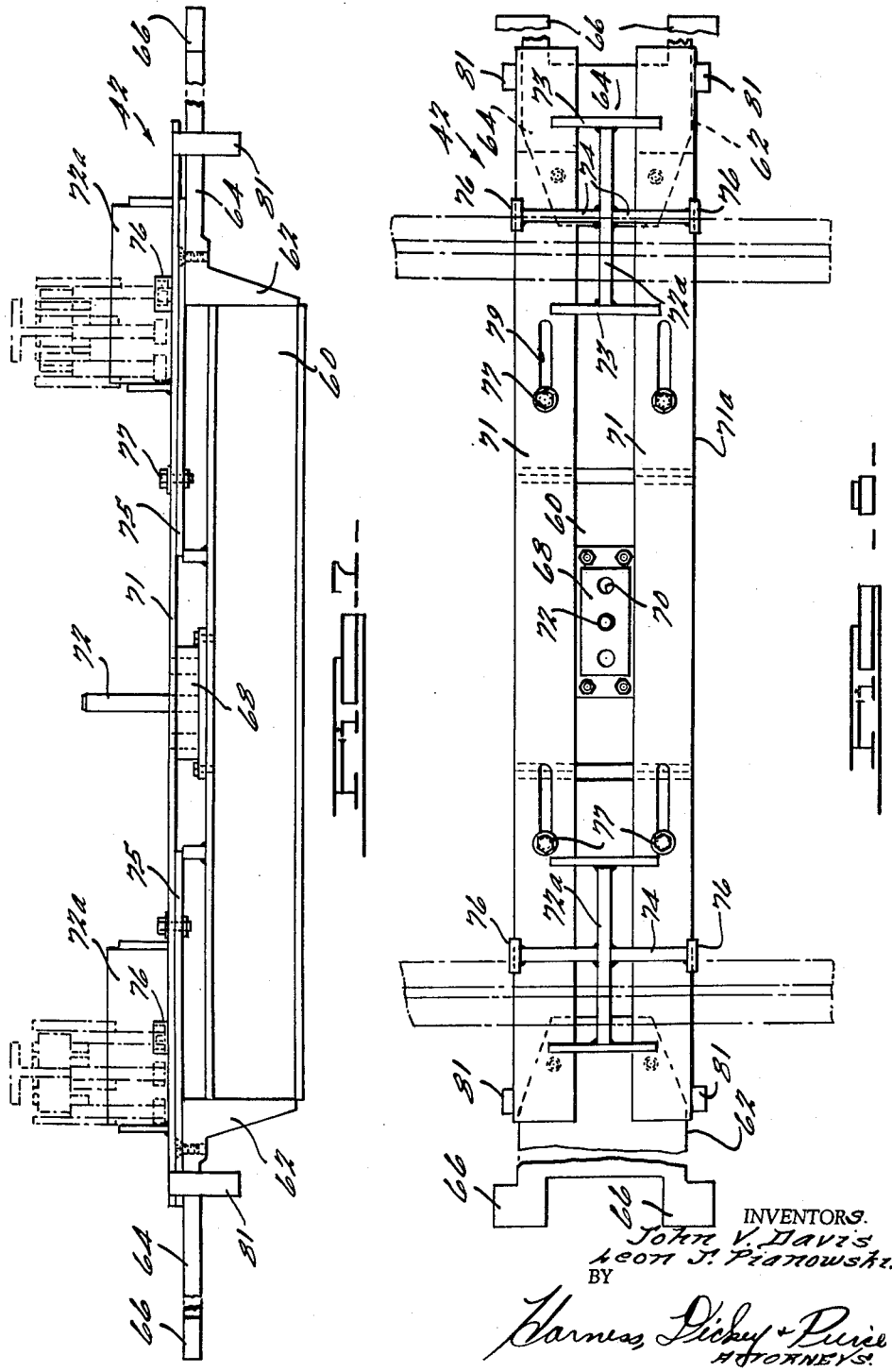

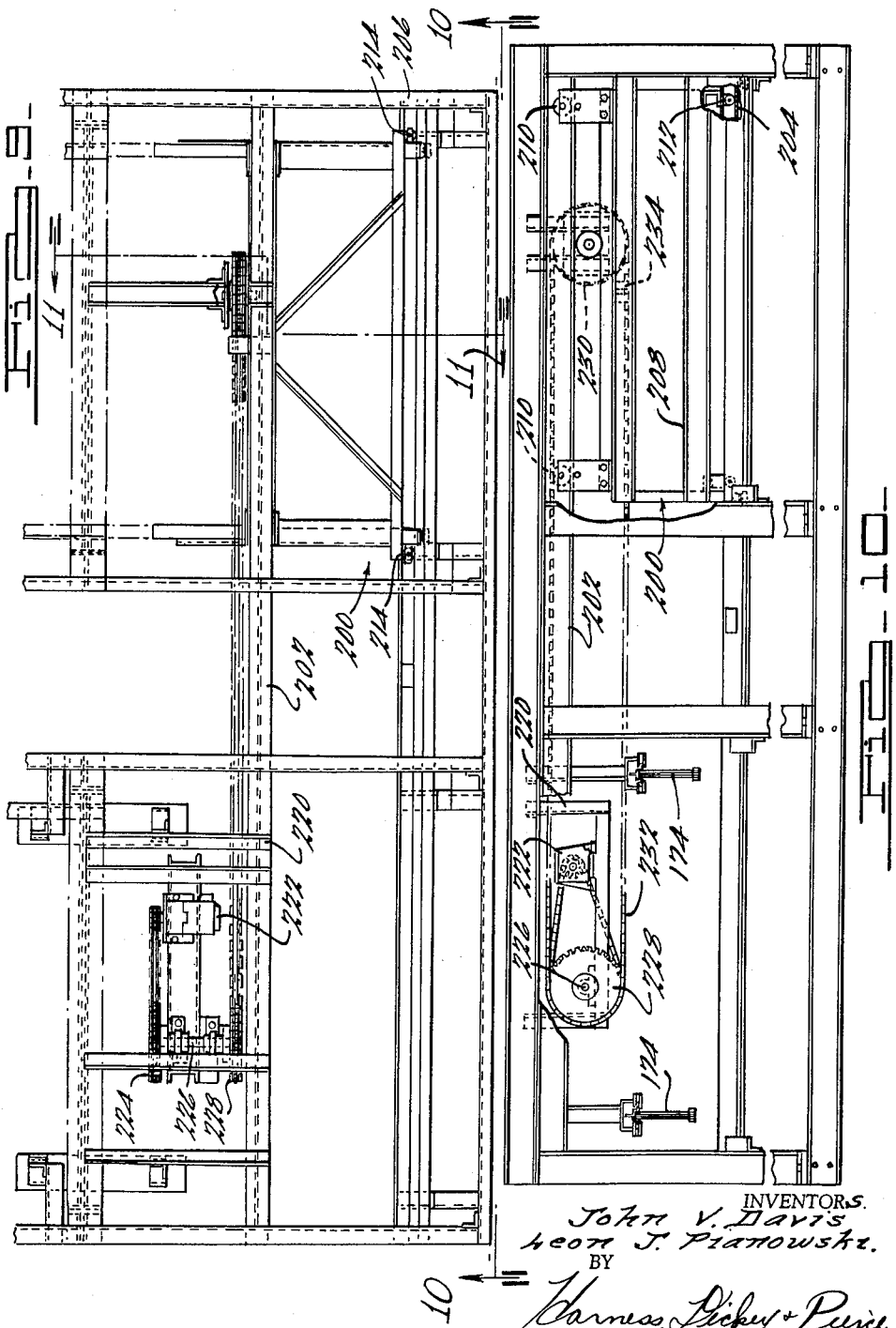

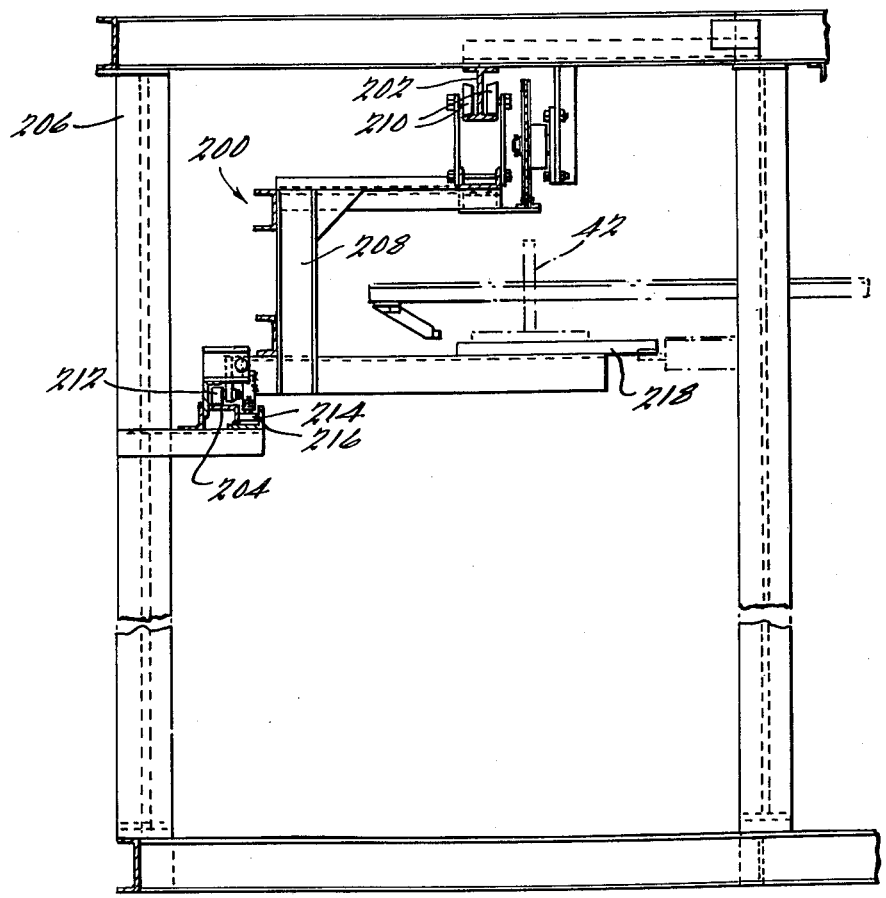

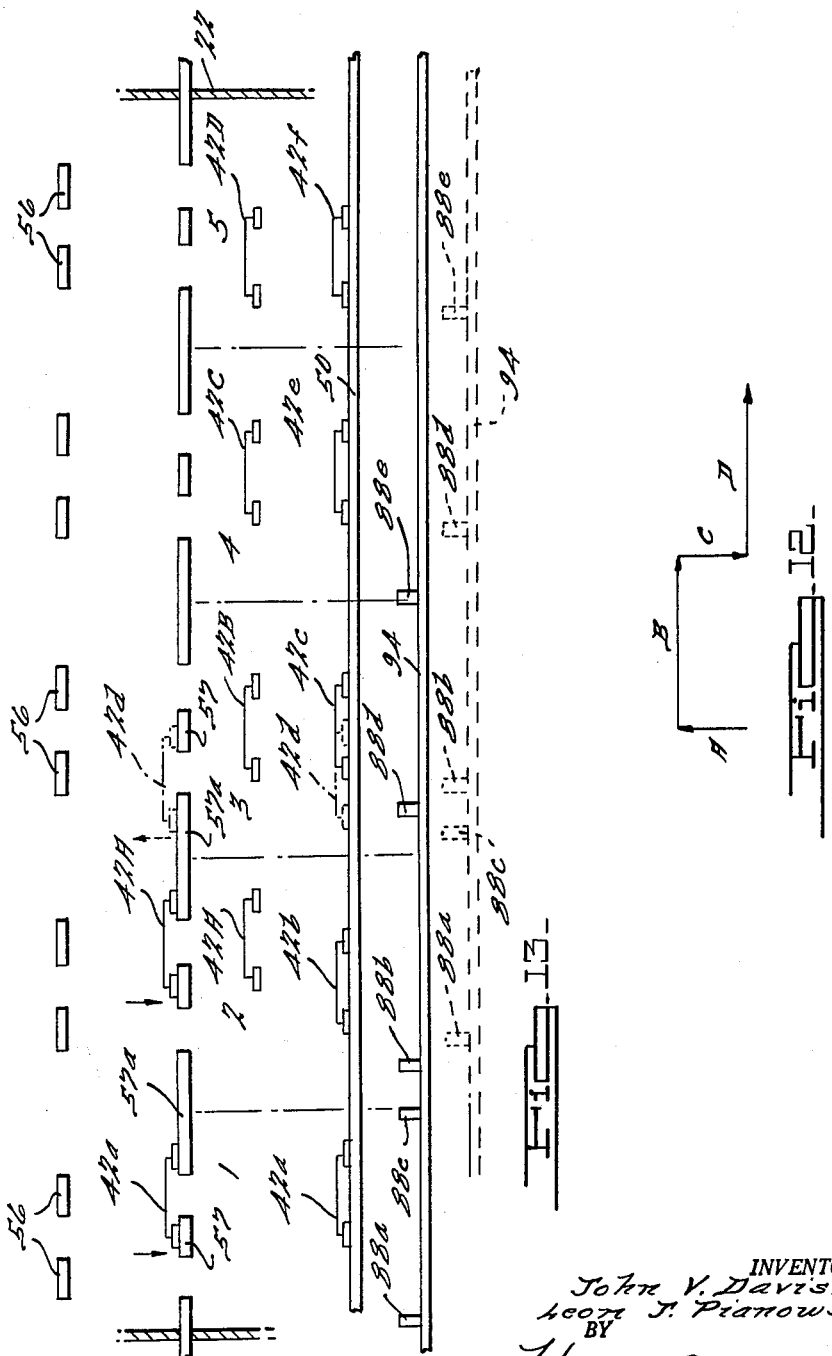

… … … … … … … … … … … … … … …

United States Patent Office 3,078,859
Patented Feb. 26, 1963

3,078,859
APPARATUS FOR LIQUID TREATING AND CONVEYING WORK
John V. Davis, Grosse Pointe Farms, and Leon J. Pianowski, Van Dyke, Mich., assignors to The Udylite Corporation, Detroit, Mich., a corporation of Delaware
Original application Mar. 30, 1959, Ser. No. 802,797. Divided and this application Sept. 25, 1961, Ser. No. 163,945
2 Claims. (Cl. 134—66)

This application is a division of application Serial No. 802,797, filed March 30, 1959.

This invention relates to work handling apparatus for moving workpieces through a predetermined cycle in a metal treating process.

Apparatus for liquid treating and conveying work of the type to which this invention relates, namely, the straight line type illustrated in United States Patent No. 2,484,079, are used for plating, anodizing, phosphating and the like processes for moving workpieces into and out of the different treatment tanks used in the processes. Since these machines are extremely large and expensive, the ultimate objective in all machines is to make the machine as flexible as possible so that it can be used in as many different processes and operations as possible. In such a machine, the objective is to make the cycle for each workpiece carrier variable and determinable by some selecting structure on the carrier so that when the carrier is introduced into the machine, the treatment cycle for workpieces on that carrier is determined.

The principal object of this invention, therefore, is to provide a flexible apparatus for liquid treating and conveying work of the above type.

A further object of this invention is to provide a work carrier in a machine of the above type which is readily adapted to different treatment cycles.

A further object of this invention is to provide a machine of the above type with improved mechanism for advancing work carriers through the machine.

Another object of this invention is to provide a machine of the above type which is simple in construction, economical to manufacture, and efficient in operation in moving work carriers through predetermined work cycles.

Further objects, features and advantages of this invention will become apparent from a consideration of the following description, the appended claims and the accompanying drawing in which:

FIGURE 1 is a diagrammatic plan view of the machine of this invention, illustrated as consisting of two side by side units designated as unit I and II;

FIG. 2 is an enlarged fragmentary sectional view looking along the line 2—2 in FIG. 1;

FIGS. 3 and 4 are enlarged fragmentary top plan views of portions of the machine shown in FIG. 1;

FIG. 5 is an enlarged sectional view looking along the line 5—5 in FIG. 1;

FIG. 6 is a fragmentary side elevational view of a portion of unit I with the vertically movable chassis removed;

FIG. 7 is a front elevational view of a work carrier in the machine of this invention;

FIG. 8 is a plan view of the carrier shown in FIG. 7;

FIG. 9 is a fragmentary plan view of one end of the machine of this invention showing the shuttle mechanism for transferring work carriers from one unit to the other;

FIG. 10 is an end view of the shuttle mechanism looking along the line 10—10 in FIG. 9.

FIG. 11 is an enlarged transverse sectional view looking along the line 11—11 in FIG. 9;

FIGS. 12 and 13 are diagrammatic views illustrating the manner in which a carrier is moved in the machine of this invention.

With reference to the drawings, the work handling machine of this invention, indicated generally at 10, is illustrated diagrammatically in FIG. 1 as including straight line units I and II arranged side by side and provided at their ends with shuttle mechanisms 12 for transferring work carriers from one unit to the other. As shown in FIG. 5, the units are of considerable height and are spaced apart sufficiently to provide for the location of a walkway 11 therebetween to facilitate access to the units. Each unit includes a plurality of treatment tanks arranged in a straight line row for applying different solutions to workpieces which are moved in one direction through each unit and dipped in some or all of the tanks in that unit.

It is to be understood that the machine 10 is usable in various treatment operations such as anodizing, plating, phosphating and the like. Since all of these processes use both single and multiple station tanks and involve the selective travel of carrier-supported workpieces through different tanks and different stations in a single tank, the machine of this invention is not described in detail herein with respect to any particular process. The term "station" is used herein to described a location in the tank at which work on a carrier is treated. The stations for any one tank are designated "first," "second," etc. in the direction of advancement of the work carriers.

The machine 10 is illustrated as being provided with a load and unload station 14 at the left end of unit II. As will clearly appear hereinafter, in machine 10 work carriers move from right to left as viewed in FIG. 1, on unit II and from left to right on unit I. From the load station 14, a work carrier is transferred, by means of one of the shuttle mechanisms 12, to the left end of unit I which has single station tanks indicated by the numeral 18 and multiple station tanks 22. In unit II the single station tanks are indicated at 28 and the multiple station tanks at 30.

The workpieces are suspended from carriers 42 (FIGS. 7 and 8) during their travel through the machine 10 and into and out of the various tanks. In each unit, the carriers 42 are supported on a pair of lower track members during the time that workpieces carried by the carriers are immersed in the tanks and they are supported on a pair of upper track members, parts of which are carried on vertically movable chassis and parts of which are stationary, during the time the workpieces are being transferred from one tank to another, as will clearly appear hereinafter.

Unit I consists of an elongated main frame 44 (FIGS. 5 and 6) which includes upright standards 46 longitudinally extending frame members 43 and cross bars 45. A chassis 48 (FIG. 5), which consists of side frames 48a which extend longitudinally of the frame 44 on opposite sides of the tanks 18 and 22, is slidably supported for up and down movement on the frame 44. A lift cylinder 458 at the top of frame 44 is connected by pairs of chains 458a to longitudinally spaced parts of the chasis 48 for raising the chassis. A pair of stationary bus bars 50 (FIG. 5) are mounted on and extend longitudinally of the frame 44 at a position between the upper and lower sides of the frame 44 and between the frame members 46. The bus bars 50 are spaced apart in a direction transversely of frame 44 a distance such that they are capable of functioning as lower tracks on which the work carriers 42 are slidably supported during the time that the workpieces on the carriers are suspended in the tanks 18 and 22 for unit I.

A pair of upper track members 52 (FIG. 5) in unit I are mounted adjacent the top side of the frame 44 and are spaced further apart than the bus bars 50. Each upper track member 52 consists of a plurality of short sections 56 (FIG. 3) arranged in pairs, with the sections 56 in each pair being separated by a space 54 which is of a uniform length for all pairs in the illustrated embodiment of the invention. The spaces 54, and the spaces 55 which separate adjacent pairs of sections 56, correspond to and are in vertical alignment with spaced track sections 57 and 57a, respectively, on the chassis 48. The space 55 between each pair of sections 56 for a given tank 22 is the same. However, the space 55 between the end section 56 above one tank and the adjacent end section for the next tank may be larger. When the chassis is in its up position the track sections 56, 57 and 57a are in horizontal alignment so that the track sections 57 and 57a substantially fill the spaces or gaps 54 and 55 to provide for continuous upper track members. As will more clearly appear hereinafter, the chassis 48 moves up and down between the upper position in which the track sections 56, 57 and 57a are aligned and a lower position in which the track sections 57 and 57a are below the bus bars 50 as shown in FIG. 5. In this latter case, when a carrier is supported on the track sections 57 or 57a, during downward movement of the chassis 48 the carrier is transferred to a supported position on the bus bars or tracks 50 when the sections 57 or 57a move downwardly past the level of the tracks 50.

In the upper position of the chassis, the work carriers on both the upper and lower tracks may be indexed because both tracks are continuous. However, while the chassis is in its lower position, only the work carriers on the lower tracks 50 can be advanced because the upper track 52 has gaps 53 and 54 through which a carrier could fall. It is to be understood that whether or not the lower carriers in a unit are indexed when the chassis for that unit is in its up position relates to the manner of operation of the machine and it can be operated either way depending on its intended specific use. The operation in which the lower carriers are indexed in both chassis positions is described hereinafter and is shown diagrammatically in FIG. 13.

The work carriers 42 are designed so that each is movable through the upper track gaps 54 and each includes mechanism which can be set to determine the cycle for that carrier. As a result, the carrier structure contributes to the flexibility of the machine 10. As shown in FIGS. 7 and 8, a work carrier 42 includes an elongated beam 60 provided with angle-shape end supports 62 each of which has a horizontal substantially U-shaped portion 64 formed with spaced fingers 66. The space between the fingers 66 is large enough for the track sections 56 and 57 to pass therethrough, and the fingers are spaced a distance apart for support on adjacent sections 56 and adjacent sections 57 and 57a, and each finger 66 is of a width such that it is movable vertically through a space 54. A socket member 68 is mounted on the top side of the beam 60 at a position substantially midway between the ends thereof. The member 68 has three openings 70 for supporting an upright actuating rod 72 at any one of three positions spaced longitudinally of the beam 60. When a carrier 42 is mounted on unit I the rod 72 is located at one of three positions which are spaced apart in a direction transversely of unit I for a purpose to appear presently.

It is seen, therefore, that the pairs of fingers 66, which provide the carrier 42 with transverse stability when it is supported, are correlated with the track sections 56 which are likewise arranged in pairs. However, it is also considered within the scope of this invention to provide a single finger 66 at each end of each carrier and provide correlated single track sections 56 in the upper stationary tracks 52. It is also within the purview of this invention to provide for a pick-up of the carriers 42 at their centers by the chassis 48 instead of at their ends.

Likewise for a purpose to appear later, the beam 60 is provided adjacent its ends with upright pusher plates 72a, each of which carries a pair of reinforcing bars 74 that extend in opposite directions from a central portion of the plate 72a. The bars 74 are mounted on a pair of spaced slide plates 71 which extend longitudinally of the beam 60. The slide plates 71, which are connected by the bars 74 and upright plates 73 at the ends of the plates 72a, are slidably mounted on frame members 75 secured to the top side of the beam 60. Bolts 77 carried by the frame members 75 extend through slots 79 in the plates 71 for clamping the plates to the beam 60 in all moved positions of the plates. A smaller abutment plate 76 is secured to the terminal end of each of the reinforcing bars 74 and is positioned in a vertical plane parallel to the pusher plates 72a for engagement by pushers advancing the carrier 42.

At their ends, the slide plates 71 carry downwardly extending legs 81 which are engaged by pushers to advance the carrier on the lower track 50.

For advancing the carriers 42 on the lower track members 50, a lower pusher assembly 80 (FIGS. 5 and 6) is provided. The assembly 80 includes a pair of pusher rods 82, each of which is illustrated as being of angle-shape in cross section, slidably supported on the frame 44 at positions below the level of the track members 50. Each pusher rod 82 carries a rack 83 which meshes with a gear 84a mounted on the frame 44. The gears 84a are connected by an equalizer bar 86 which extends transversely of the frame 44 and provides for concurrent reciprocation of the pusher rods 82 when a pair of hydraulic cylinder assemblies 84, which are pivotally mounted on frame 44 and correspond to the pusher rods 82, are actuated. Each pusher rod 82 is connected to a parallel bar 90 positioned above and connected to the rod by parallel links 85. A plurality of upwardly extending pusher dogs 88 are secured to the upper bar 90 in a predetermined spaced relation. Each upper bar 90 can thus be swung between a lower position (shown in solid lines in FIG. 6) and an upwardly moved position (shown in dotted lines in FIG. 6) in which a stop 89 at one end of the bar 90 engages one end of the corresponding rod 82.

Each hydraulic cylinder assembly 84 has its piston rod 87 pivotally connected to the lower end of a lever 91 which has an upper end portion 93 that is parallel to the links 85 and is pivotally connected to and extends between the corresponding rod 82 and bar 90. As a result, on extension of the piston rods 87 for the two assemblies 84, which are operated in unison, the levers 91 first pivot about their connections to the rods 82 so that the bars 90 are swung upwardly and to the left as shown in FIG. 6 until the stops 89 engage the ends of the rods 82. On continued extension of the piston rods 87, the rods 82, bars 90 and dogs 88 are moved toward the right.

The dogs 88 have their upper ends located below the depending carrier legs 81 in the lower positions of the bars 90. When the cylinder assemblies 84 are actuated to move the pusher rods 82 toward the right as viewed in FIG. 6, all of the dogs 88 swing upwardly to positions engageable with a carrier leg 81, for advancing the carriers 42 toward the right as viewed in FIG. 6.

The pusher dog 88 is shown as having appreciable width and being formed with a notch 93 which is located so that it is horizontally aligned with the leg 81 on the carrier 42.

The plates 71 on the carrier 42 are movable to positions in which the depending legs 81 thereon are either in or out of alignment with the notches 93 in a pair of transversely aligned dogs 88, as desired. The notches 93 in each such pair of dogs 88 are spaced apart a distance equal to the spacing of the legs 81 on the carriers 42. In the embodiment shown, this spacing is constant. On retraction of the piston rods 87, to move the pusher rods 82 to the left, the upper bars 90 fall downwardly under the action of gravity to return the dogs 88 to positions below the work carrier legs 81.

As a result, on retraction of the piston rods 87, the dogs 88 are movable to positions behind the work carrier legs 81 so that on the forward stroke, all the work carriers 42 are advanced a distance equal to the length of the stroke of the cylinder assembly 84 minus the lost motion distance which each dog 88 is spaced behind the work carrier 42 to be advanced thereby. This distance is variable, depending on the location of the pusher dogs 88 on the pusher bars 90 and can be adjusted by relocating the dogs 88.

In a multi-station tank 23, the station at which the work on a particular carrier is withdrawn is determined by the location of the legs 81 on the carrier. This is accomplished by locating the pusher dogs 88 in pairs on each bar 90, with the distance between each pair corresponding substantially to the length of the track space 54. The arrangement of the dogs 88 is of course identical on both bars 90. The forward dog in each pair has a notch 93 while the rear dog does not. As a result, a carrier 42 with legs 81 located in alignment with the notches 93 in the forward dogs 88 is advanced by the rear dogs 88 to a position in which it is in vertical alignment with the lower rail sections 57 and 57a and the fingers 66 straddle a pair of spaces corresponding to a pair of upper track sections 56. A carrier which has its legs 81 out of alignment with the notches 93 in the forward dogs 88 is engaged by those dogs and moved a distance sufficient to position the carrier fingers 66 in vertical alignment with the spaces between the rail sections 57 corresponding to the fixed rail sections 57 and 57a. As a result, the first mentioned carrier is withdrawn from the tank and the last mentioned remains in the tank for subsequent advancement to a position where it is withdrawn.

For advancing the work carriers 42 on the upper track members 52, a pair of T-shape pusher bars 94 (FIG. 6) are slidably supported for reciprocal movement on the frame 44 at positions above the track members 52 and each pusher bar 94 is provided with two types of pivotally mounted pusher dog units which depend therefrom and the arrangement of the dog units on the bars 94 is identical so that when a carrier is advanced it is always engaged simultaneously at both its ends by a pair of pusher dogs. A first type consists of a single pusher dog 96 pivotally supported on the bar 94 for up and down swinging movement between a substantially horizontal position adjacent the underside of the bar 94 and a downwardly and forwardly inclined position as shown in FIG. 6. The term "forwardly" has reference to the direction of movement of carriers 42 on unit I. A second type of unit, consists of a pair of dogs, a first short dog 100 and a second longer dog 102 which carries a transversely extending rod 104 adjacent its lower end and is positioned ahead of the shorter dog. Each of the dogs 96, 100 and 102 has its upper end mounted on a horizontal pivot 101 (FIGS. 2 and 7) carried by plates 103 suspended from the supporting pusher bar 94 therefor and is movable up and down about the pivot 101 between an upper substantially horizontal position and a lower inclined position in which the upper end of the dog strikes a plate 105 secured to the bottom side of the pusher bar to limit downward swinging of the dog. Each of the pusher bars 94 carries a rack 107 which meshes with a gear 109 mounted on the frame 44. The gears 109 are connected by a transverse equalizer bar 108 so that the pusher bars 94 reciprocate concurrently on actuation of a hydraulic cylinder assembly 106 having its piston rod connected to one of the pusher bars and having its cylinder mounted on the frame 44.

Each pusher bar 94 is supported in spaced slide units 111 (FIG. 2) mounted on the frame 44. A unit 111 includes pairs of rollers 113 which support slide plates 115 secured to the top side of the bars 94. Guide straps 117 on the units 111 overlie the slide plates 115 for maintaining them on the rollers 113.

The double dog units are located in unit I at positions above the multiple station tanks 22 and operate as part of station selector mechanisms, indicated generally by the numeral 112 in FIGS. 3 and 6, to determine for each carrier 42 the tank station at which the workpiece on that carrier will enter the tank. The mechanisms 112 are also usable in the same manner with successive single station tanks to determine which of the tanks will be entered by the workpieces on each carrier. Each mechanism 112 includes a series of four gate assemblies 114, 116, 118 and 120 which correspond to four of the double pusher dog units in the main frame 44 for unit I. Intermediate its ends, the lever 122 supports a pair of upwardly projected links 125 which are pivotally connected at their upper ends to the lower end of an inclined operating arm 126 (FIG. 6) which is secured at its opposite end to a shaft 128 (FIG. 2) which extends transversely of the main frame 44. The shaft 128 is rigidly connected at its ends to upright supporting bars 130 for a pair of transversely spaced movable gate members 132 each of which is arranged for movement between a first horizontal position located between and in line with a pair of stationary gate members 134 and 136 and a second forwardly moved inclined position in which a space separates the member 132 from the member 134. The stationary gate member 136 carries a downwardly and forwardly extending ramp 140 at its forward end, which is spaced behind the stationary gate member 134 in the gate assembly 116. The gate members 132, 134 and 136 support the rod 104 on the corresponding dog 102 in a manner to be described presently. The levers 122 for the gate assemblies for any one tank 22 are aligned in a direction longitudinally of unit I and the levers 122 for different tanks are spaced transversely of unit I for a purpose to appear presently.

In the operation of a station selector mechanism 112 assume that the stations for one of the tanks 22 are designated 1, 2, 3, 4 and 5 in the order they are passed over by a carrier on unit I. As a work carrier 42 approaches a tank, the actuating rod 72 carried thereby may either be in line with the operating levers 122 for the gate assemblies 114, 116, 118 and 120 for that tank or it may be to one side of the levers 122 depending on the socket 70 in which the rod 72 is mounted and the position of the slide plates 71.

In the event it is to one side of the levers 122, none of the levers 122 will be operated during travel of that carrier 42 over the tank. As a consequence, during forward movement of each of the dog units the longer dog 122 will be held in its upper position by the travel of the rod 104 therefor on the gate members 132, 134 and 136 until after the shorter dog 100 has engaged the carrier 42. Consequently, the carrier is moved a distance corresponding to the stroke of the pusher bar 94 minus the distance the shorter dog 100 is spaced behind the carrier 42 prior to advance of the pusher bars 94.

This distance is correlated with the position of the dogs 100 so that the carrier 42 is located at a position in which the fingers 66 at opposite ends thereof are supported on pairs of fixed track sections 56 so that the carrier 42 does not descend with the chassis 48. During retraction of the pusher bars 94, the rods 104 travel upwardly on the ramps 140 to positions supported on the gate assemblies so that the longer dogs 102 are again lifted to their horizontal upper positions.

In the event the actuating rod 72 on the carrier 42 is in line with the levers 122, the height of the rod 72 determines at which station the workpiece on the carrier 42 enters the tank. In the event the actuating rod 72 extends above the carrier 42 a distance greater than the distance the actuating lever 122 for the first cell is spaced above the carrier 42, the actuating rod 72 engages the lower end of the actuating lever 122 and swings it upwardly. Upward swinging movement of the lever 122 causes rotation of the corresponding shaft 128 with a resultant upward swinging movement of the movable gate members 132 carried thereby. The lever 122 is positioned relative to the dogs 96 and 100 so that each carrier 42 which is to enter the tank at the station, which corresponds to this particular lever 22, stops in a lever actuating position shown in FIG. 9 when the forward movement of the pusher bars 94 is terminated. Consequently, on retraction of the pusher bars 94, the rods 104 for the pair of pusher units drop through the spaces between the gate members 132 and 136 so that the longer pusher dogs 102 are in position to engage and advance the carrier 42 when the pusher bars 94 are next advanced.

Because the longer dogs 102 are ahead of the shorter dogs 100, the carrier 42 is advanced an increased distance, relative to the carrier which is advanced by the short dogs 100, by an amount equal to the distance between the lower ends of the dogs 100 and 102 in each unit. This distance is correlated with the location of the stationary upper rail sections 56 and the location of the dogs 100 and 102 in each unit so that this advance is sufficient to locate the carrier 42 on the rail sections 57 and 57a on the chassis 48 in a position in which each pair of carrier fingers 66 straddle a fixed rail section 56. Consequently, when the chassis 48 descends, the carrier 42 moves downwardly with it so that the workpiece thereon is immersed in the liquid in the tank at the first station.

When the carrier 42 has been moved out of a position directly below the actuating lever 122 for the first station, the gate member 132 is returned to its position by the action of gravity. Consequently, on retraction of the pusher rods 94, the rod 104 for the pusher unit travels upwardly on the ramp 140 therefor to a supported position on the gate assembly so that the longer pusher dog 102 is held in an upper horizontal position awaiting the next advance of the pusher rods 94, unless another carrier 42 has been moved to a position actuating the lever 122 corresponding to the pusher unit.

It can thus be seen that in the mechanism 112, the longer dogs 102, which are operable on engagement with a carrier 42 to move it to a position in which the fingers 66 therefor are supported on the chassis rail sections 57 and 57a, are normally disenabled, i.e., held up out of engagement with a carrier when the pusher bars 94 are advanced, and are only lowered to operative positions by movement of a carrier 42 to a lever actuating position.

It is seen, therefore, that as regards unit I, the location of the actuating rod or rods 72 on a carrier determines the tank or tanks which will be entered by the workpiece on that carrier. Consequently, since each carrier 42 is illustrated as having three sockets 70, it can be set when it is introduced to the machine so that it will enter any number between zero and three of the tanks 22. However, it is to be understood that any number of sockets can be used to accommodate the carrier to the number of tank selections required in a particular process. The length of each rod 72 determines which station of the tank will be entered by a workpiece on a carrier 42. The location of the legs 81 on each carrier determines at which station in each tank entered by the workpiece on that carrier the workpiece will be lifted out of the tank.

It is apparent, however, that a carrier 42 cannot be lifted so as to remove the work thereon from a tank 22 equipped with a selector mechanism 112 prior to movement of the carrier to a position past the gate assembly 120, namely, to a position at the fifth station in the tank 22. If the carrier is lifted prior to this time, the rod 72 hereon will jam into the frame member 124 for the next gate assembly. A tank 22 may, however, have more than five stations in which case the legs 81 can be utilized to determine the tank station at which the work will be removed. Also, the number of gate assemblies may be reduced in a mechanism 112 to make the time of removal of work from the tank more flexible. In an anodizing or plating tank the cell selector mechanism 112 may be omitted so that all work to be treated in the tank enters at the first station, and the legs 81 are utilized to determine the station at which the work will be removed.

It is seen, therefore, that the carriers 42 are readily adjusted and unit I readily adapted to provide the desired carrier travel for obtaining a given travel path for work on a carrier through the tanks 18 and 22. By adjusting the variable components in the carrier in unit I, work on a carrier can be immersed in the desired tanks for the desired times with the desired degree of exposure of the work to the atmosphere between tanks.

Unit II (FIG. 5) includes a main frame 150 like the main frame 44, having upright standards 152 on which a chassis 154, like the chassis 48 previously described, is slidably supported for up and down movement. A lift cylinder 460 at the top of frame 150 is connected by pairs of chains 460a to the chassis 154 for raising the chassis. A pair of transversely spaced bus bars 156 extend longitudinally of the frame 150 and function as lower tracks on which the work carriers 42 are slidably supported during the time that workpieces on the carrier are suspended in the tanks for the unit II.

A pair of upper track members 158 in unit II are spaced above the bus bars 156 a distance corresponding approximately to the depth of the tanks in unit II so that when a work carrier 42 is supported on the upper track members 158, the workpiece which is suspended therefrom is above any work carriers on the lower tracks 156. Each upper track member 158 consists of a plurality of short sections 162 arranged in pairs, with the sections 162 in each pair being separated by a space 160 which is uniform for all pairs. The spaces 160, and the spaces 161 which separate adjacent pairs of sections 162 (FIG. 4), correspond to and are positioned in vertical alignment with spaced track sections 163 and 165, respectively, on the chassis 154. Consequently, when the chassis 154 is moved to its upper position, the track sections 163 and 165 substantially fill the spaces 160 and 161, respectively, so that the upper track members 158 are substantially continuous. As a result, when the chassis 154 is in its upper position, a work carrier 42 is readily slidable longitudinally along the upper track members 158. In a lower position of the chassis 154, the track sections 163 and 165 are below the fingers 66 on the carriers 42 which are supported on the lower track members 156. A pusher or carrier indexing assembly 166, identical to the pusher assembly 80 on unit I, is provided for advancing the carriers 42 on the lower track members 156.

For advancing the work carriers 42 on the upper track members 158, a pair of T-shape pusher bars 170 (FIG. 5) are slidably supported on slide units 111 carried by the frame 150 at positions above the track members 158.

Since the shuttle mechanisms 12 at opposite ends of units I and II are substantially identical, only one mechanism 12 will be described in detail. One significant advantage of the shuttle mechanisms 12 is that they take up a minimum of space while providing for the necessary transfer of carriers 42 between units I and II. Furthermore, this transfer is accomplished concurrently with up and down chassis movement, thereby affording the greatest time saving.

Each mechanism 12 includes a cart 200 (FIGS. 9, 10 and 11) mounted for travel on a pair of horizontal rails 202 and 204 carried on an upright framework 206 which extends transversely of units I and II at one end thereof. The rail member 202 is mounted on the frame 206 adjacent the top side thereof and the rail 204 is below and to one side of the rail 202.

The cart 200 consists of a main frame 208 (FIG. 10) provided with pairs of upper rollers 210 which ride on the rail 202 and a pair of lower rollers 212 which ride on the rail 204. A pair of rollers 214 are mounted on the frame 208 at a position adjacent the rollers 212 and travel in a track 216 located adjacent the rail 204 for stabilizing the cart 208 against transverse swinging movement during travel thereof longitudinally of the framework 206.

The cart frame 200 carries a pair of cantilever-supported track members 218 which are spaced such that they can be positioned in horizontal alignment with either the upper track members 52 on unit I or the upper track members 158 on unit II.

Adjacent one end of the framework 206 is a subframe 220 which supports a hydraulic motor 222 that drives a sprocket 224 mounted on one end of a shaft 226 on the sub-frame 220. The opposite end of the shaft 226 supports a sprocket 228 positioned in the vertical plane of a second sprocket 230 supported on the framework 206 adjacent the opposite end thereof. A chain 232 trained about the sprockets 228 and 230 is connected at 234 to the car 200. Consequently, on operation of the motor 222 to drive the chain 232 in a clockwise direction as viewed in FIG. 9, the cart 200 is moved from a position opposite the end of unit I to a position opposite the end of unit II. Rotation of the sprocket 232 in an opposite direction moves the cart 200 in an opposite direction to return it to its position opposite unit I.

The motor 222 is controlled so that it operates automatically in a timed relation with the up and down movement of the chassis 48 and 154 which move in opposite directions. When the chassis 48 is in its "up" position, the chassis 154 is in its "down" position and vice versa. When the chassis 48 is moving upwardly, the chassis 154 is moving downwardly at the same rate of speed and vice versa, there being a predetermined time delay period between the time a chassis reaches one position and the time it begins its return movement to its other position. During this time delay period, the carriers are indexed. The hydraulic motor 222 for the cart 200 operates with the same time delay periods as the chassis and moves between its two positions concurrently with movement of the chassis 48 and 154.

Consequently, when a chassis 48 or 154 is in its "up" position, the carts 200 for the mechanisms 12 are positioned so that the track sections 218 on the carts are in horizontal alignment with the tracks 52 or 158 on the chassis 48 or 154, respectively, depending on which one is in its "up" position. During actuation of the upper transfer mechanism for the unit which has its chassis in its "up" position, a first carrier 42 is moved off one set of track sections 218 onto one end of the chassis and a second carrier 42 at the opposite end of the chassis is moved off the chassis onto the other pair of track members 218.

For the purpose of illustrating the operation of the work-handling machine 10 of this invention, the operation of each unit for advancing a workpiece through one multiple-station tank is explained in detail hereinafter. The operation for the other multiple-station tanks will be apparent from the description of one. A carrier 42 is loaded onto the machine at station 14 from which it is transferred to the shuttle mechanism 12 when the chassis 154 is in its "up" position and then to the upper tracks 52 for unit I, when the chassis 48 is in its "up" position. The carrier 42 is then at a position above the first single station tank 18. When the chassis 48 descends, the carrier 42 is lowered onto the lower track members 50 and the workpiece on the carrier 42 is dipped in the solution in the tank 18. During operation of the lower transfer mechanism 80, the carrier 42 remains in a stationary position on the lower track members 50 since no pusher dogs are provided on the pusher assembly 80 at the single station tanks.

On a subsequent upward movement of the chassis 48, the carrier 42 is moved upwardly. In an "up" position of the chassis 48, the carrier 42 is advanced by the upper transfer mechanism across the wall between the first and second tanks 18 so that when the chassis 48 next moves downwardly the carrier 42 moves downwardly to dip the workpiece thereon in the solution in the second tank 18. The carrier is then moved so that this procedure is repeated and the workpieces thereon are dipped successively in all of the tanks 18. In the event a single station tank 18 is to be equipped so that an advancing carrier can select to be immersed or skip such tank, the chassis rail is provided with gaps and permanent track sections and selector apparatus is provided such as is hereinafter described in connection with multi-station tanks.

In the illustrated machine, the carrier track sections 57 are continuous above the tanks 18 so that no workpieces are held out of any tank.

When a carrier 42 reaches a multi-station tank 22, it may or may not be lowered to a position in which the work thereon is dipped in the solution in the tank. This depends on whether or not the carrier stem 72 is aligned with the actuating levers 122 for the cell selecting mechanism for the tank 22, as previously described. If the work on the carrier 42 is to be dipped in tank 22, the stem 72 on the carrier 42 is initially aligned with the levers 122 above the tank and the length of the stem 72 is chosen so that the work will enter the tank at the desired station.

The carrier 42 is equipped with an actuating rod 72 that is positioned such that it actuates the first lever 122 in the selector mechanism 112. Consequently, the carrier 42 moves downwardly with the chassis 48 at a position above the first station in the tank 22. The carrier 42 is moved longitudinally of the tank 22 while it is slidably supported on the lower track members 50 so that the workpieces on the carrier remain in the tank 22 during the time the carriers are being advanced longitudinally of the tank. This is accomplished by locating the lower pusher dogs 88 so that each time the chassis 48 moves upwardly the carrier 42 has its fingers 66 vertically aligned with gaps in the chassis rail corresponding to the fixed upper track sections 56. The tank station at which the carrier moves upwardly, to withdraw the workpieces from the tank, is determined by the location of the depending legs 81 and the location of the notches 93 in some of the dogs 88.

The lower pusher dogs 88 are arranged in pairs at the stations at which selection of carriers to be raised is desired. The first dog 88 is provided with a notch 93 and the second dog 88 is of a solid construction. Consequently, if the notch 93 in the first dog 88 is aligned with the leg 81 on the carrier 42, the leg 81 passes through the notch and is engaged by the second dog 88. The advance of the carrier 42 is accomplished by the second dog 88 and this advance is sufficient only to place the carrier on the lower rails 50 either at a position opposite spaces between chassis track sections 57 and 57a so that the carrier will not be raised with the chassis or at a position in which it will be raised, as desired. If the notch in the first dog 88 is located so that the dog engages the carrier, it is either advanced past the space between track sections 57 and 57a so that it is raised with the chassis or is positioned in line with the chassis track spaces, as desired. The location of the legs 81 on a carrier is thus correlated initially with the location and construction of the dogs 88 and the stroke of the pusher bars 82 to determine the cell at which work on that carrier will leave a tank.

When the chassis 48 is in its "up" position, the carriers on the chassis track sections 57 and 57a and the upper track sections 56 are indexed so that the carrier 42 at the extreme right hand end of unit I as viewed in FIG. 1 is moved onto the cantilever track sections 218 on cart 200 (FIG. 10). The chassis 48 then moves downwardly and during the time it is descending, the cart 200 is traveling from a position in which the track sections 218 are aligned with the upper track on unit I to a position in which they are aligned with the upper track on unit II. The chassis 154 on unit II is being elevated at the same time that the chassis 48 is moving downwardly and the cart 200 is traveling from unit I to unit II. Consequently, when the chassis 154 has reached its upper position, the track members thereon are aligned with the track sections 218 on cart 200. As a result, when the pusher rods 170 are actuated to accomplish an indexing of the carriers on unit II, the carrier 42 is moved off the tracks 218 onto the upper track members 158 for unit II.

The carrier 42 is advanced by pusher dogs through the single station tanks 28 to a position on the upper track members 158 preparatory to being advanced to a position above the first station in a multi-station tank 30. The location of the abutment plates 76 determines whether or not work on the carrier will be immersed in the tank 30 and the height of the plates 76 on the carrier determines which station in the tank the work will enter. The station at which the work will be withdrawn from the tank is determined by the location of the legs 81. In the event the plates 76 on the carrier are of a height such that they are engaged by subsequent pusher dogs above the tank from which the work on the carrier has just been withdrawn, it will be lowered again so that the work on the carrier will again be immersed in the tank. If re-immersion is not desired the pusher dogs are located so that the abutment plates 76 on the carrier will not be engaged again while the carrier is over the tank. It can thus be seen that the workpieces carried by the carrier 42 may enter different tanks, stay in some tanks longer than others and have different drying times between different tanks, depending on the construction and location of the abutment plates 76, the location of the legs 81, the location and lengths of the dogs and the stroke of the pusher bars on which the dogs are mounted, all of which may be determined at the time the carrier 42 is positioned on the machine 10.

FIG. 12 illustrates diagrammatically the operation of the upper and lower pusher assemblies in both units I and II to advance a work carrier through the machine 10. The arrow A indicates upward movement of the chassis 48. The arrow B indicates advance of the upper pushers in the "up" position of the chassis. The arrow C indicates descent of the chassis 48 and the arrow D indicates that only the lower pusher mechanism is actuated when the chassis is "down." All strokes are of course adjustable by adjusting the hydraulic cylinder assemblies.

In FIG. 13 the movement of carriers is illustrated diagrammatically with respect to a multi-station tank 22 having stations indicated by the numerals 1, 2, 3, 4, and 5 and chassis tracks, made up of sections 57 and 57a and having gaps corresponding to the upper track sections 56 fixed on the frame 44. The chassis tracks are shown in positions intermediate the upper and lower positions of the chassis. A pusher rod 94 having dogs 88 is shown in solid lines in the position it occupies relative to the track sections 57 and 57a prior to movement in a direction to advance the work carriers and in dotted lines after it has been advanced. Assume that a work carrier 42 is lowered on the track sections 57 and 57a into a position supported on the lower tracks 50 at a location in which work on the carrier is immersed at the first station. This position of the work carrier is indicated diagrammatically at 42a. The pusher rods 94 are then actuated so that the dogs 88a engage the carrier 42a and move it to a position 42b, in which position it is in station number two in vertical alignment with spaces between track sections 57 and 57a. The stroke of the rods 94 is indicated by the horizontal distance between the solid and dotted line positions of the dog 88a. Consequently, when the chassis is raised, the carrier remains on the lower tracks 50.

The pusher rods 94 are then retracted so that they will be in a position to again advance the carrier 42 when the chassis 48 is again lowered. On the next forward movement of the pusher rods 94 the dogs 88b engage the carrier and move it to the position indicated at 42c in station number three which is likewise in vertical alignment with the next pairs of gaps in the chassis tracks. Consequently, the carrier 42 is not lifted when the chassis is next raised. If withdrawal of the work on carrier 42 from the tank 22 at station three is desired, the legs 81 on the carrier are aligned with notches 93 in the dogs 88b so that the legs 81 are engaged by the dogs 88c which are spaced behind the dogs 88b a distance such that the carrier is advanced only to a position shown at 42d above chassis track sections 57 and 57a. As a result, the opposite ends of the carrier are engaged by the track sections 57 and 57a when the chassis is next raised.

From the position indicated at 42c, the carrier is moved successively to positions 42e and 42f in stations four and five by dogs 88d and 88e and is raised with the chassis 48 at station five.

The travel of a carrier 42A which is lowered onto the lower tracks at a position above station two and is lifted off the lower tracks at a position above station five is illustrated by designating successive positions of the carrier with successive letter suffixes B, C, D, etc.

Coordination of the sequentially phased movement of the several transfer mechanisms, chassis, shuttles, etc. is suitably accomplished by a series of limit switches connected to the central control system of the machines.

From the above description, it is seen that this invention provides a versatile work handling machine 10 which is operable to perform a large variety of work handling sequences. The flexibility of the machine 10 for different work handling operations is obtained by changing the location of the station selector mechanisms on the machine frame and the selector structure on the carriers 42. Furthermore, each sequence for any carrier is determined by the structure of that carrier at the time it is introduced into the machine 10. Consequently, complete control can be exercised over any part to be handled merely by selecting the carrier on which that part will travel through the machine 10. The pusher assemblies for advancing and retracting the lower pusher dogs 80, which must be moved upwardly to be in positions engageable with carriers on the lower tracks 50 on forward movement of the pusher rods and must be moved downwardly in order to pass below the carriers on the tracks 50 on a return movement of the pusher rods, are constructed so that the required up and down movement of the dogs at the desired times is insured.

It will be understood that the specific construction of improved work handling apparatus which is herein disclosed and described is presented for purposes of explanation and illustration only and is not intended to indicate limits of the invention, the scope of which is defined by the following claims.

What is claimed is:

1. Work handling apparatus for moving work into and out of treatment tanks arranged in side by side rows, said apparatus comprising a pair of longitudinally extending conveyor mechanisms arranged in a side by side relation, each of said mechanisms including a vertically movable chassis mounted for movement between a lower position in which work thereon is immersed in a treatment tank and an upper position in which the work is above the tanks, means for moving said two chassis so that when each chassis is in its lower position the other chassis is in its upper position and so that said two chassis move concurrently between said positions, a pair of shuttle units extending between corresponding ends of said mechanisms, each of said shuttle units including a carriage for conveying work from one end of one conveyor mechanism to the corresponding end of the other conveyor mechanism, each of said carriages being mounted for horizontal movement at a level corresponding substantially to the upper positions of said chassis, and means for coordinating the travel of said carriages so that they are at opposite ends of each chassis in the upper position thereof.

2. Work handling apparatus for moving work into and out of treatment tanks arranged in side by side rows, said apparatus comprising a pair of longitudinally extending conveyor mechanisms arranged in a side by side relation, each of said mechanisms including a vertically movable chassis mounted for movement between a lower position in which work thereon is immersed in a treatment tank and an upper position in which the work is above the tanks, means for moving said two chassis so that when one chassis is in its lower position the other is in its upper position and vice versa and so that said two chassis move concurrently between said positions, means for moving work carriers horizontally along each chassis in both positions thereof, a pair of shuttle units extending between corresponding ends of said mechanisms, each of said shuttle units including a carriage for conveying work carriers from one end of one conveyor mechanism to the corresponding end of the other conveyor mechanism, each of said carriages being mounted for horizontal movement at a level corresponding substantially to the upper positions of said chassis, and means for coordinating the travel of said carriages so that they are at opposite ends of each chassis in the upper position thereof.

References Cited in the file of this patent

UNITED STATES PATENTS

| | | |
|---|---|---|
| 1,601,528 | Hall | Sept. 28, 1926 |
| 2,102,308 | Daw | Dec. 14, 1937 |
| 2,958,331 | Borodin | Nov. 1, 1960 |